United States Patent
Suzuki

(12) 
(10) Patent No.: US 6,466,263 B1
(45) Date of Patent: Oct. 15, 2002

(54) ELECTRONIC STILL CAMERA HAVING POINTING INDICATOR SHOWING OPERATION MODE

(75) Inventor: Takeshi Suzuki, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/464,346

(22) Filed: Jun. 5, 1995

Related U.S. Application Data

(60) Continuation of application No. 08/418,609, filed on Apr. 7, 1995, now abandoned, which is a division of application No. 08/234,351, filed on Apr. 28, 1994, now abandoned.

(30) Foreign Application Priority Data

Apr. 28, 1993 (JP) .............................................. 5-102140
Jul. 20, 1993 (JP) .............................................. 5-201107

(51) Int. Cl.[7] .............................................. H04N 5/225
(52) U.S. Cl. ...................................... 348/220; 348/207
(58) Field of Search ................................ 348/207, 220, 348/333, 334, 552, 13, 15, 16, 17, 143, 221; 396/281, 287, 290, 291, 292, 297, 300, 429; 455/154.1, 157.2, 158.1, 158.4; 386/77, 107, 117; 358/400; H04N 5/225

(56) References Cited

U.S. PATENT DOCUMENTS

| | | | | |
|---|---|---|---|---|
| 4,485,406 A | * | 11/1984 | Brownstein | 348/97 |
| 4,845,634 A | * | 7/1989 | Vitek et al. | 364/468 |
| 5,111,288 A | * | 5/1992 | Blackshear | 348/143 |
| 5,396,287 A | * | 3/1995 | Cho | 348/211 |
| 5,424,772 A | * | 6/1995 | Aoki et al. | 348/221 |
| 5,541,656 A | * | 7/1996 | Kare et al. | 348/334 |
| 5,598,209 A | * | 1/1997 | Cortjens et al. | 348/211 |
| 5,727,049 A | * | 3/1998 | Sato | 348/552 |

* cited by examiner

Primary Examiner—Tuan Ho
(74) Attorney, Agent, or Firm—Pillsbury Winthrop LLP

(57) ABSTRACT

An image processing apparatus for taking pictures and storing them in an applied storage device generates and outputs an image signal photoelectrically converted from an image incident thereon, transmits and/or receives image information generated in this apparatus or a similar apparatus when an operation mode of the apparatus is set for a communication operation, and stores the telephone number of the destination in a predetermined address of an applied solid state memory means in which the telephone number can be maintained without the application of a power source.

10 Claims, 9 Drawing Sheets

FIG. 8D ⇩ DEPRESS SET SW FOR 5 SEC OR MORE

FIG. 8E ⇩ DEPRESS SET SW FOR 5 SEC OR MORE

SETTING COMPLETION

EVF OR MONITOR

TEL.NO.
TEL 1 0426 917xxx
↓
PRIORITY NO.

LCD

15

05

TRANSMISSION MODE

AFTER SET SW IS OPERATED.

TEL 2 033402xxx

15

05

EVF OR MONITOR

FLICKERING
TEL 1: 0426 917xxx

LCD

15

1

FIG. 10B ⇓ AFTER SET SW

TEL 1-0426-917xxx

15

04

◀▶ AFTER SW IS OPERATED

TEL 1-0326917xxx

15

03

AFTER SETTING THE FINAL DIGIT BY DEPRESSING SET SW FOR FEW TIMES.

TEL-2-0333402xxx

TEL-3- ------

15

3

ELECTRONIC STILL CAMERA HAVING POINTING INDICATOR SHOWING OPERATION MODE

This application is a continuation of Ser. No. 08/418,609, abandoned, which is a division of Ser. No. 08/234,351 filed Apr. 28, 1994, abandoned.

BACKGROUND OF THE INVENTION

The present invention relates to an image processing apparatus and, more particularly, to an image processing apparatus which can deal with a plurality of different image display modes which are different the aspect ratio, pixel number, etc.

With recent advancement of the digitization of electronic still cameras, there are increasing demands for reproducing and processing photographically picked-up image data with a personal computer (hereinafter abbreviated as PC). From the consideration of the versatility with such PCs and like apparatuses with respect to data, there have been proposed systems in which an IC memory card for use with a PC or the like is used as a recording medium for an electronic still camera for recording data in the IC memory card in the PC file format. As the image format for such an electronic still camera, what conforms to the NTSC standard data format (effective pixel number: 768×480) is usually thought to be useful. On the other hand, the pixel number of PCs is usually 640×400, 512×512, 640×480, and so forth.

The electronic still camera as noted above conforms in the data format to various television signal standards such as the NTSC, PAL, etc. standards. Therefore, when a PC or the like with a smaller pixel number than the standard is used to reproduce image data that is picked-up with an electronic still camera, the overall screen of image data cannot be displayed.

In addition, the aspect ratio of a PC display is usually horizontally about 1.2 times that of an electronic still camera CCD image pick-up component. Therefore, image data picked-up with the electronic still camera, when displayed on the PC display, results in slightly vertically squeezed images. It is possible to compensate the data with software or the like on the PC. However, the compensation requires arithmetic operations which delay the reproduction, which is undesired.

Such an electronic imaging apparatus as described above, which is for practical use, has a function of transmitting image information to another electronic imaging apparatus via some medium, for instance, a telephone line. For image data transmission via a telephone line, it is necessary to dial the telephone number of the destination. An apparatus for dispensing with the telephone number dialing by the user whenever data transmission is to be made is disclosed in Japanese Patent Laid-Open Publication No. H2-25143 and Japanese Patent Laid-Open Publication H3-157083. In this disclosed apparatus, the telephone number of the partner side, i.e., the destination, is recorded on a magnetic disk on which image information is recorded.

However, where image to be transmitted is recorded on a disk A while the destination telephone number is recorded on a disk B, it is necessary to delete the telephone number originally stored on the disk A and copy the destination telephone number originally stored on the disk B onto the disk A as a superseder. This poses problems in operation control properties.

Japanese Patent Laid-Open Publication H3-157083 shows the use of a keyboard as telephone number input means. However, this is not realistic, particularly when the electronic imaging apparatus is a memory card camera or similar small camera, because with such a camera only a restricted number of switches can be mounted.

SUMMARY OF THE INVENTION

An object of the present invention is, therefore, to provide an image processing apparatus capable of processing the image data of a different mode without any special conversion process or the like.

Another object of the present invention is to provide an image processing apparatus which can facilitate the destination telephone number setting at the time of the image data transmission and has excellent operation control properties.

According to one aspect of the present invention, there is provided an image processing apparatus for processing image information so as to be adaptable to an applied display device comprising a discriminating means for discriminating an image data format chosen from among a plurality of image data formats each defined by a corresponding displaying format inclusive of aspect ratio format or pixel number format, on the occasion of recording provided image information in an applied recording medium, and an auxiliary data recording means for recording auxiliary data representative of the chosen data format in a predetermined area of the recording medium in such a manner that the auxiliary data is capable of being reproduced while maintaining a correlation between the auxiliary data and the corresponding image data.

According to another aspect of the present invention, there is provided an image processing apparatus for processing an image information so as to be adaptable to an applied display device comprising, a discriminating means for discriminating an image data format corresponding to a displaying format inclusive of aspect ratio format or pixel number format, based on reproduced auxiliary data representative of the image data format, on the occasion of reproducing, and an image data format information applying means for applying an image data format information representative of discrimination made in the discriminating means so as to determine a reproduced image data format.

According to another aspect of the present invention, there is provided an image processing apparatus being operable in a plurality of operation modes inclusive of a data transmitting mode and a data receiving mode those modes, where are selectively switched by a user comprising switching means for selectively switching the operation mode from the data transmitting mode to the data receiving mode or vice versa, responding to a displacement of a predetermined switching member, and display means for displaying whether a present operation mode is the data transmitting mode or the data receiving mode by a symbolic pointing display pointing direction which corresponds to to a direction of the displacement of the switching member.

According to a further aspect of the present invention, there is provided an image processing apparatus which is operable in a plurality of operation modes inclusive of a camera mode for taking a picture and a communication mode for transmitting or receiving image data, where those modes are selectively switched by an user comprising a command switch means for selectively switching operating modes between a recording mode and a play-back mode, in case the camera mode is set, and for selectively switching operating modes between a transmitting mode or a receiving mode, in case the communication mode is set.

According to a still further aspect of the present invention, there is provided an image processing apparatus for taking pictures and storing them in an applied storage device, the apparatus comprising image pick-up means for generating and outputting an image signal photoelectrically converted from an image incident thereon, communication means for transmitting and/or receiving image information generated in this apparatus or another equivalent apparatus while an operation mode of the apparatus is set for operation, and storing a means for storing telephone number of the destination in a predetermined address of an applied solid state memory means in which the telephone number is capable of being maintained without any power source.

According to a further aspect of the present invention, there is provided an image processing apparatus for taking pictures and storing them in an applied storage device, the apparatus comprising image pick-up means for generating and outputting an image signal photoelectrically converted from an image incident thereon, communication means for transmitting and/or receiving image information generated in this apparatus or the another equivalent apparatus while an operation mode of the apparatus is set for communication, storing means for storing telephone number information of the destination in a predetermined address of an applied solid state memory means in which the telephone number is capable of being maintained without any power source, and means for transferring the telephone number information between the predetermined address of the solid state memory means and an auxiliary data file in which file an auxiliary information data representative of relating information for corresponding image information stored in a main stored.

Other objects and features will be clarified from the following description with reference to the attached drawings.

BRIEF DESCRIPTION OF THE DRAWINGS

FIG. 8A to FIG. 8E show an example of display on the EVF 88 and LCD 95 in the normal mode;

FIG. 10A to FIG. 10E show an example of display in the telephone number setting mode;

PREFERRED EMBODIMENTS OF THE INVENTION

Preferred embodiments of the present invention will be described below.

Figure 1:
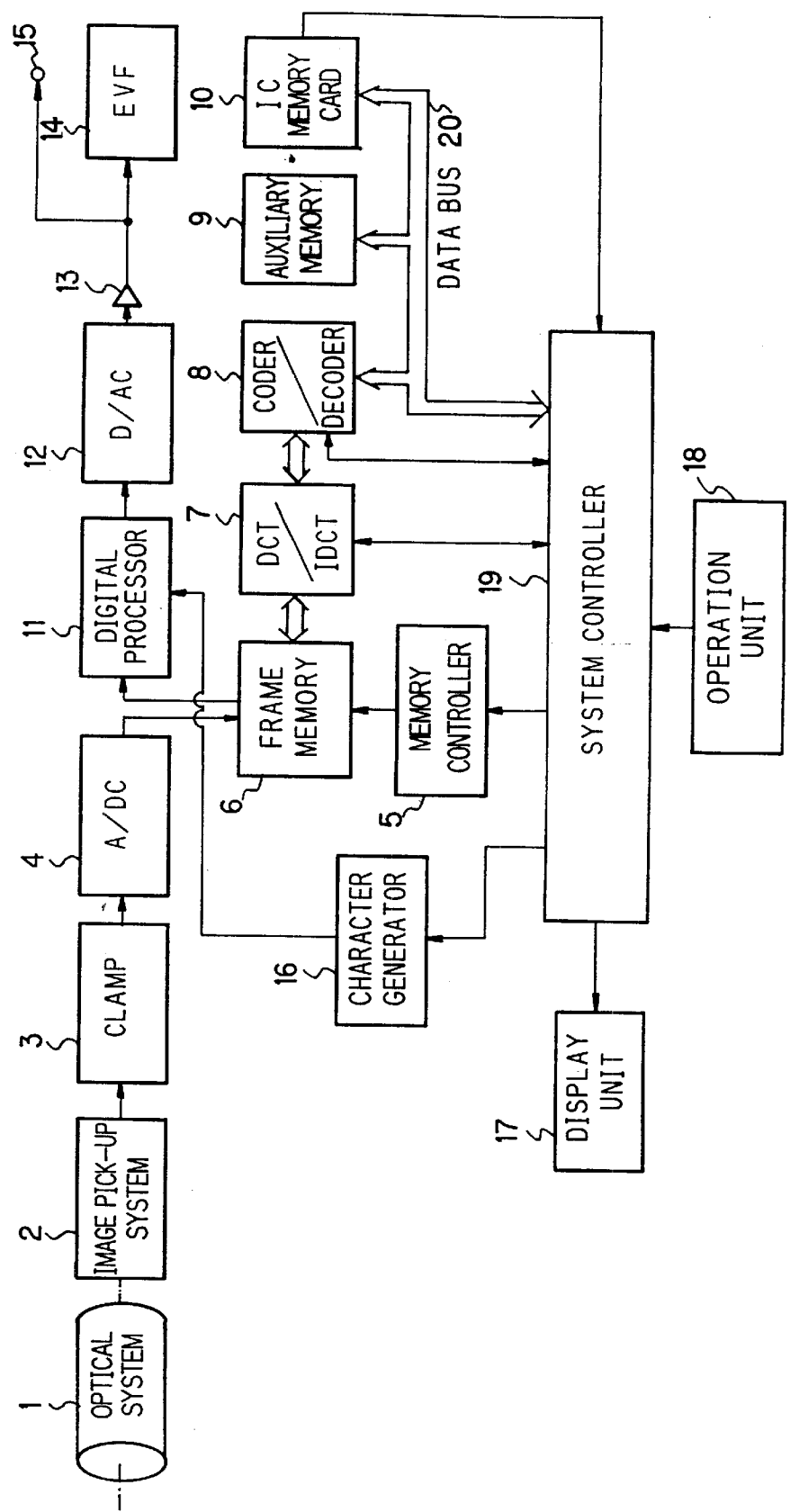
FIG. 1 shows an embodiment according to the present invention applied to an electronic still camera used with an IC memory card as the recording medium.

FIG. 1 shows an embodiment of the present invention applied to an electronic still camera used with an IC memory card as the recording medium. The construction of the embodiment will now be described along the flow of signal with reference to FIG. 1.

An optical image of an object incident on an optical system 1 is coupled to an image pick-up system 2 with CCD or the like disposed in an image formation plane for conversion into an analog electric signal. The image pick-up system 2 thus outputs an image picked-up signal, which is held at a constant DC level by a clamp circuit 3 and then converted by an analog-to-digital converter (hereinafter referred to as an A/D converter) 4 into a digital signal, which is written in a frame memory 6 to be temporarily memorized.

When the writing of data in the frame memory 6 has been completed, data is read out therefrom under control of a memory controller 5 to be coupled to a discrete cosine conversion circuit (hereinafter abbreviated as DCT, also shown as DCT/IDCT 7 in FIG. 1) for data conversion which is required for data compression, the converted data being output to a coder/decoder 8. The coder/decoder 8 has a coder section, in which the video data is compressed with reference to an auxiliary memory 9 in which various data and tables necessary for the data compression are written. The compressed data thus obtained is written via a data bus 20 in an IC memory card 10 which is data recording means detachably mounted in the electronic still camera.

The description of the electronic still camera will now be continued along signal flow when reproducing video data recorded in the above way.

Data read out from the IC memory card 10 is fed through the data bus 20 to the coder/decoder 8. In a decoder section of the coder/decoder 8, the compressed data noted above is decompressed back to the initial data before the data compression. The decompressed data is subjected to an inverse discrete cosine conversion in the DCT/IDCT 7 and then written in the frame memory 6. When the decompression process for all data has been completed, data are read out from the frame memory 6 under control of the memory controller 5 for conversion in a digital processor 11 into a video signal conforming to the NTSC standard, for instance. The video signal is then converted in a D/A (digital-to-analog) converter 12 into an analog signal and then 75 Ω impedance matched, for instance, in a buffer 13. Then, the image is reproduced in an electronic view finder (hereinafter referred to as EVF) 14 such that it can be observed therein. The video signal is also supplied to a video output terminal 15.

The electronic still camera includes, in addition to the above composing elements, a character generator 16, which can generate character information about date, time, etc. to be displayed as an on-screen display, a display unit 17 for displaying various operation modes to be described later, and an operation unit 18 for giving the camera various commands causing designated operations. The above various composing elements are cooperatively controlled by a system controller 19.

Data to be recorded on the above IC memory card 10 or a similar recording medium is subjected before recording to a format conversion to a format which is recognizable on the PC (concretely the DOS format, for instance).

Figure 2:
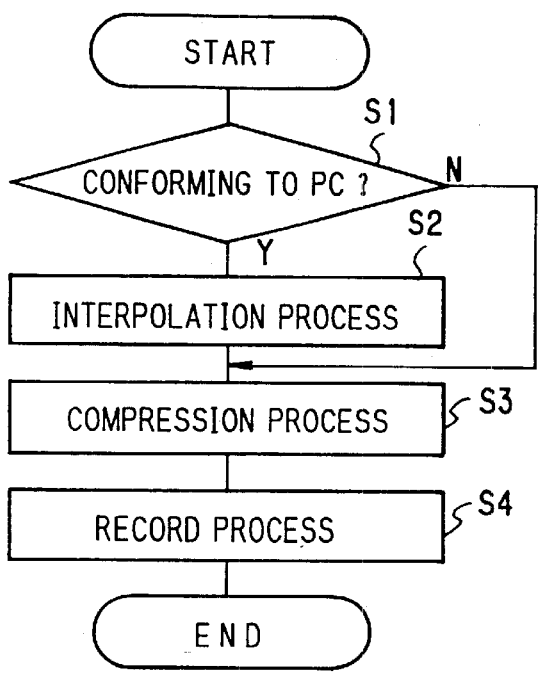
FIG. 2 shows a flowchart representing an operation of recording data with the electronic still camera of FIG. 1.

Now, an operation of recording data with the above electronic still camera will be described with reference to the flow chart shown in FIG. 2.

When the operation is started, a recognition as to whether the electronic still camera is in a camera mode or in a PC mode, is made depending on the state of a recording mode switch 49 (see FIG. 4), which is mounted on the operation unit 18, as recording mode recognition means to be described later (step S1). If the PC mode is present, an interpolation process in the vertical direction is executed to obtain data conforming to the aspect ratio of the display for the PC (step S2). Specifically, it is possible to obtain data conforming to the PC display, the aspect ratio of which in the vertical direction is 1.2 times, by sending one line of the same data as that in one of every five lines, for instance, in response to a command from the memory controller 5 when the image data written in the frame memory 6 is transferred to the DCT/IDCT 7. When the camera mode is present, this interpolation is not required and not executed.

The interpolated image data is then compressed in the DCT/IDCT 7 (step S3), and then recorded on the IC memory card 10 or a similar recording medium as noted above (step S4). At this time, the result is that image data of two different formats coexists on the recording medium. Accordingly, an identifier is provided. More specifically, in a leading portion of each image data, a flag indicative of the PC mode or camera mode is provided as header information, which is to be referred to for classification and recognition of data conformity with displaying in the play-back mode or the like.

In the PC, for the data classification purpose, extenders may be added in file names used in the DOS (disk operating system), for instance "PC" may be added to a PC file, and "CAM" to a camera file. Further, a control file or (otherwise known as "relational file") the like which supervises generally the various kinds of image data may be provided on the recording medium to permit classification and management of image data. In this case, classification can be obtained by writing data in the control file.

Figure 3:
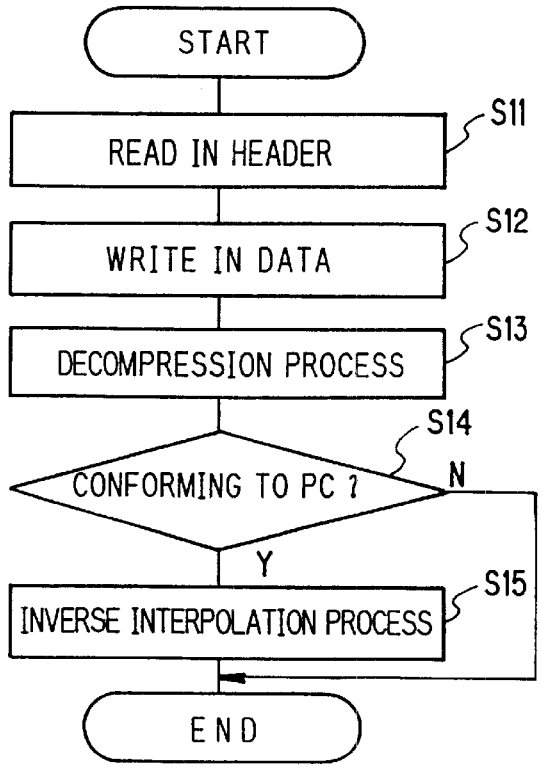
FIG. 3 shows a flowchart representing an operation of reproducing data with the electronic still camera of FIG. 1.

Now, an operation of reproducing data with the above electronic still camera will be described with reference to the flow chart shown in FIG. 3.

A case of the reproducing operation will be considered, in which classification data is written in the header. In a play-back mode, data stored in the IC memory card 10 or similar recording medium is read in. At that time, a header in the leading portion of data is first read (step S11), and then the actual image data is read (step S12). Then, the data is decompressed in the decoder section of the coder/decoder 8 (step S13) and then subjected to the necessary inverse discrete cosine conversion process in the DCT/IDCT 7. Then, the system controller 19 makes a decision from the flag of the header having been read as to whether the image data is for the camera or for the PC (step S14).

When the data having been read is image data for the PC, it is written in the frame memory 6 while executing an inverse process to the interpolation process that has been executed at the time of the recording noted above (i.e., inverse interpolation process) (step S15). More specifically, at the time of the recording, after every five lines have been supplied, one interpolation line as noted above is supplied from the DCT/IDCT 7. Accordingly, a process of omitting this one extra line is executed under control of the memory controller 5 according to a command from the system controller 19. Through such inverse interpolation process, the data which has been written in the IC memory card 10 with the aspect ratio format conforming to the PC display can be reproduced without any problem on a monitor conforming to the NTSC standard. If the data having been read is the data for the camera, it is directly written in the frame memory 6 without executing any inverse interpolation process.

Figure 4:
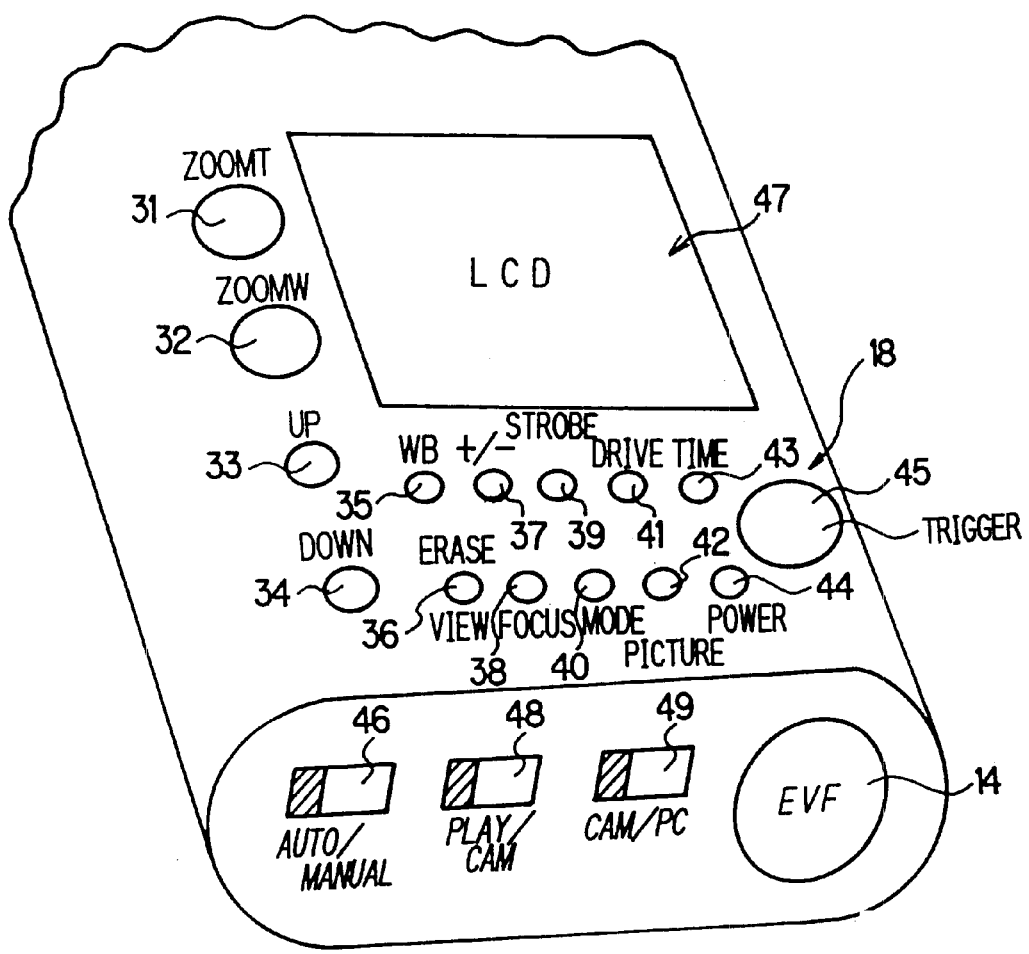
FIG. 4 shows a partial view of the electronic still camera according to the present invention.

Now, the operation of the electronic still camera according to the present invention will be described with reference to an example of operation unit 18 as shown in FIG. 4.

The electronic still camera, as shown, has its top provided with an LCD 47 which constitutes the above display unit 17 for displaying various states of the camera. On the left side of the LCD 47, a zoom tele switch (shown as ZOOMT in FIG. 4) 31 is provided on a forward side, and a zoom wide switch (shown as ZOOMW in FIG. 4) 32 is provided on just this side.

This side of the zoom switches 31 and 32, an up switch (shown as UP in FIG. 4) 33 and a down switch (shown as DOWN in FIG. 4) 34 are provided which are used in the recording mode for the switching of modes, such as white balance, shutter speed, exposure compensation value, power focus, etc., and also for the adjustment of individual values. In the play-back mode, these switches are used for frame feed, frame return and so on.

On the right side of the up and down switches 33 and 34, 10 different switches are provided in two rows and five columns. These switches will now be described from the first to the fifth column in succession.

The first column, first row switch is a white balance switch (shown as WB in FIG. 4) 35, which is operable in the recording mode for white balance adjustment, for instance, switching such white balance modes as an auto mode, a fine day mode, a cloudy day mode, etc. The first column, second row switch is a view switch (shown as VIEW, ERASE in FIG. 4) 36, which, in the recording mode, can cause immediately previously recorded image to be reproduced while it is depressed and, in the play-back mode, erases the photographed frame. The second column, first row switch is an exposure compensation switch (shown as +/−in FIG. 4) 37, which, in the recording mode, switches exposure modes, for instance, an auto iris mode and a manual iris mode. The second column, first row switch is a focus switch (shown as FOCUS in FIG. 4) 38, which, in the recording mode, switches focus modes, i.e., an AF mode and a power focus mode. The third column, first row switch is a strobe switch (shown as Strobe in FIG. 4) 39, which, in the recording mode, switches strobe modes, for instance, an auto strobe mode, a strobe-off mode, an external strobe mode, etc. The third column, second row switch is a compression mode switch (shown as MODE in FIG. 4) 40, which, in the recording mode, switches various compression modes as will be described later. The fourth column, first row switch is a drive switch (shown as DRIVE in the FIG. 4) 41, which, in recording mode, switches recording speed modes, i.e., a self-timer mode, a continuous photograph mode, an interval photograph mode, etc. and, in the play-back mode, switches play-back speeds,i.e., an interval play-back speed, a continuous play-back speed, etc. The fourth column, second row switch is a picture switch (shown as PICTURE in FIG. 4) 42, which, in the recording mode, switches mainly color hues, color darkness, etc. The fifth column, first row switch is a time switch (shown as TIME in FIG. 4) 43, which, irrespective of the prevailing mode of the electronic still camera, sets up a time setting mode for updating the date, such as year, month, day, time, etc, set by the date function of the camera when it is depressed continuously for 3 seconds, for instance. The fifth column, second row switch is a power source switch (shown as POWER in FIG. 4) 44, which on-off switches the power source of the electronic still camera.

Figure 5:
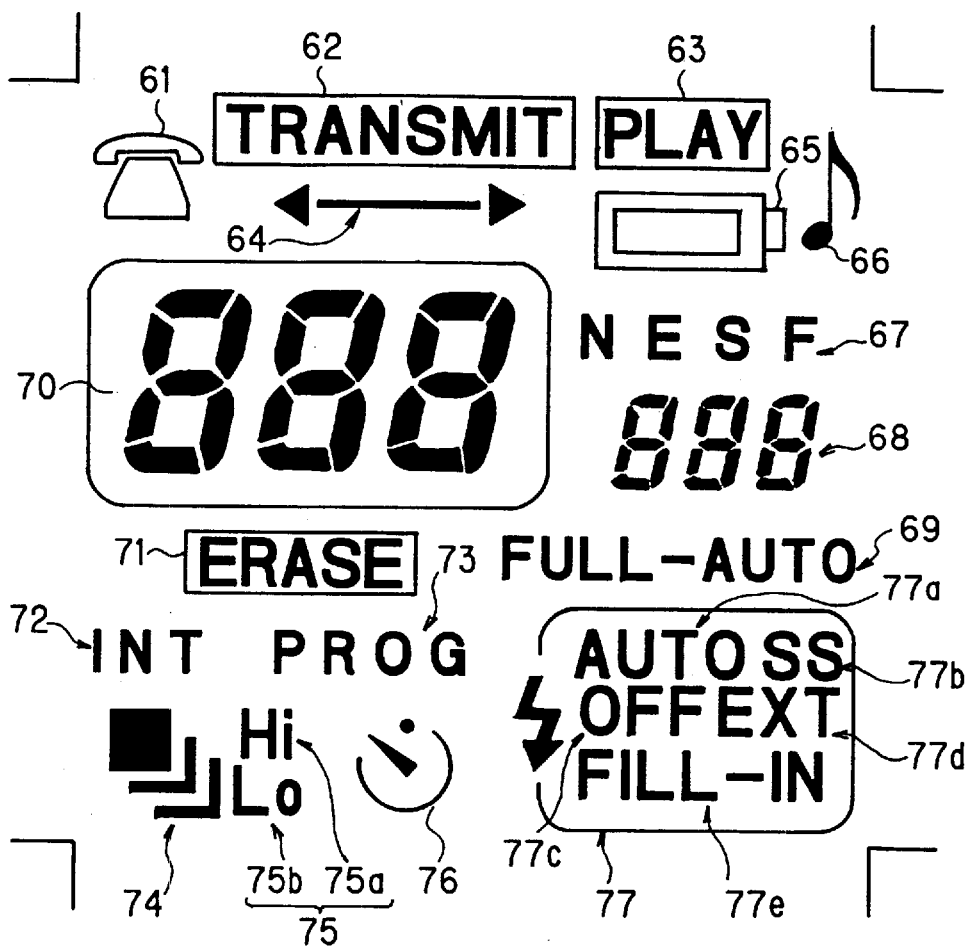
FIG. 5 shows examples of the display on the LCD 47 in FIG. 4.

The time switch 43, more specifically, is such that when the time setting mode is set up, the year is displayed as a flicker display on the LCD 47 in a frame number display section 70 thereof (see FIG. 5). At the same time, in the display on the electronic view finder 14, in which the year, month, day, hour and minute are all displayed, the year portion is flickered first of all. The flickering portion can be updated by operating the up and down switches 33 and 34. Likewise, whenever the time switch 43 is depressed, once again the display of the month, day, time, etc. is sequentially provided afresh as a flicker display. The display thus can be updated with the up and down switches 33 and 34. Of course, at this time in the electronic view finder 14, the updated portion is likewise flickered. Further, the time switch 43 can be also used for on-off switching a timing sound at the time of the start of the recording or various alarm sounds by depressing it for a short period of time instead of holding it depressed for three seconds or more.

On the right side of the switches 35 to 44 noted above, a two-step trigger switch (shown as TRIGGER in FIG. 4) 45 is provided, which designates AF lock in the first step and start of the recording in the second step.

The rear face of the electronic still camera has an auto/manual switch (shown as AUTO/MANUAL in the FIG. 4) 46, a record/play-back switch (shown as PLAY/CAM in the FIG. 4) 48 and a camera/PC switch (shown as CAM/PC in the FIG. 4) 49, these switches being provided in the mentioned order from the left side. The auto/manual switch 46 of slide type, in the recording mode, permits switching of a full auto photograph mode, in which the white balance, focus, exposure adjustment, etc. are all set automatically, and a manual photograph mode, in which the above settings are manually adjustable. The record/play-back switch 48 is a two-step switch and can set up the recording mode when it is brought to the left and set up the play-back mode when it is brought to the right. The camera/PC switch 49 of slide type, in the recording mode, permits switching of the camera and PC modes for recording. On the right side of these switches 46, 48 and 49, the electronic view finder (shown as EVF in the FIG. 4) 14 is provided.

The apparatus mentioned above is capable of dealing with images digitally and permitting image communication through a telephone line. In this case, the following functions may be assigned to one of the switches in the above switch constitution in order to provide for improved operation control properties. To the record/play-back switch 48, which is for switching between recording mode and play-back mode in case the camera mode is set, may be assigned a function of switching transmission/reception in case a communication mode is set. To the trigger switch 45, which is operable to start the photographing in the camera mode, may be assigned a function of causing the start of transmission/start of reception in the communication mode. To the time switch 43, which is for setting the date and time in the camera mode, may be assigned a function of setting the telephone number of the destination to be transferred. To the compression mode switch 40, which is for switching the compression mode in the recording mode, may be assigned a function of switching the play-back/transmission/reception sequentially each time it is depressed. To the drive switch 41, which is for switching the photograph modes such as the continuous photograph mode in the camera mode, may be assigned a function of switching, in the transmission mode, a variety of transmission modes, single frame transmission, all frames transmission, programmed transmission, in which certain specific frames are transmitted continuously, etc.

By assigning a plurality of functions to limited switches in the above way, it is possible to obtain a high degree of operation control properties with a simple switch arrangement, i.e., without deteriorating the operation control properties with an increase of the number of switches. The assignment of the plurality of functions to switches as above is made such that the functions provided by the switches can be easily recognized intuitively by the operator, lest the operator should be confused.

Now, examples of the display on the LCD 47 will be described with-reference to FIG. 5.

A telephone mark display 61 and a "TRANSMIT" display 62 indicated when they are turned on, constitute a transmission mode display indicative of the transmission mode. When they are turned off, they indicate the normal camera mode.

In the periphery of the underside of the display 62, an arrow mark display 64 is provided. When the transmission mode in which the displays 61 and 62 are turned on is set up, the central bar shape and the left side triangle shape of the display 64 are turned on at a time to display an arrow directed to the left, which indicates a transmission mode of transmitting image data from the electronic still camera to a telephone line. When the central bar shape and the right side triangle shape are turned on at a time, thus displaying an arrow directed to the right, a reception mode is shown, in which image data from the telephone line is received. The direction of the arrow in the display 64 coincides with the slide direction, in which the record/play-back switch 48 is slid to switch the transmission and reception in the transmission mode. The display thus can be easily understood intuitively by the operator.

A "PLAY" display 63 indicated is a play-back mode display, that is, when it is turned on, it indicates that the electronic still camera is in the play-back mode.

A battery mark display 65 under the display 63 is a battery alarm display indicative of the consumption degree of the main battery of the electronic still camera. When the battery is consumed to a certain degree, a right side large block inside the display is turned off, thus making it easily understood as a residual battery quantity reduction. When the battery is thoroughly consumed, a left side small block inside the display is also turned off to indicate that the battery is used up.

A musical note mark display 65 on the right side of the displays 63 and 65 is a buzzer display indicative of the "on"/"off" state of a timing sound at the time of the start of the recording or various alarm sounds.

An "N", an "E", an "S" and an "F" display 67 provided under the displays 65 and 66 are for displaying a compression mode set up by the compression mode switch 40. The display "N" indicates a normal compression mode. The display "E" indicates an economical compression mode, of which the compression factor is high compared with the normal compression, thus permitting recording of more images. The display "S" indicates a studio compression mode, of which the compression factor is low compared with the normal compression, thus permitting recording of precise images. The display "F" indicates a fine non-compression mode, in which image is recorded without any compression process.

A three 7-segment display 68 under the displays 67 is the display of the number of residual frames for displaying the residual capacity recordable to the IC memory card 10 or similar recording medium in terms of the number of photographed sheets or the like.

A "FULL-AUTO" display 69 under the display 68 is for displaying a full-auto mode in the recording mode.

A strobe mode display 77 under the display 69 is for displaying various strobe modes. Specifically, an "AUTO" display 77*a* is for displaying an auto strobe mode. An "SS" display 77*b* is for displaying a slow shutter strobe mode. An "OFF" display 77*c* is for displaying a strobe off mode. An "EXT" display 77*d* is for displaying an external strobe mode. A "FILL-IN" display 77*e* is for displaying a compulsory strobe flash mode.

Returning to the central left portion of the display of the LCD 47, the three large 7-segment display 70 enclosed in a frame, in the recording mode, displays the number of frames to be photographed next and, in the play-back mode, displays the number of frames being played-back.

An "ERASE" display 71 indicated under the display 70 is for displaying an erase mode such as an all erase mode to erase one frame or all frames.

An "INT" display 72 on the left side under portion of the display 71 displays an interval mode, i.e., interval recording in the recording mode and interval play-back in the play-back mode.

A "PROG" display 73 on the right side of the display 72 displays a programmed mode, i.e., programmed recording in the recording mode and programmed reproduction in the play-back mode.

An overlapped rectangle mark display 74 under the display 72 displays a continuous photograph mode to record, for instance, five continuous frames per second in the recording mode.

A display 75 comprising a "Hi" display 75*a* and a "Lo" display 75*b* on the right side of the display 74 displays the speed of the continuous photograph mode displayed in the display 74 on of the interval photograph mode displayed in the display 72. The "Hi" display 75*a* is turned on when the speed is high, while the "Lo" display 75*b* is turned on when the speed is low.

A mark display 76 on the right side of the display 75 displays a self-timer mode.

As a whole, the display area is arranged such that the segments which are turned on in the recording mode are provided on the lower side, while the segments which are turned on in the play-back mode are provided on the upper side, so that the operator can easily recognize the arrangement with the visual sense.

With the embodiment as shown, the operator can photograph the image in the camera mode when it is intended to play-back the data in television while photographing the image in the PC mode when it is intended to take out the image into the PC, thus permitting promptly play-back on the PC of data with a conforming aspect ratio and without need of any special process. In addition, image data obtained by photographing in the PC mode can be played-back in television as it is without being recognized by the operator, and it is possible to easily obtain a data link between the electronic still camera and the PC. Thus, the electronic still camera which has heretofore been mainly thought to be an apparatus for displaying image data on a television monitor, can be provided as a universal image input apparatus, which can provide image data in conformity with various image processing apparatuses in a wide range of fields.

In the above embodiment, structured as shown in FIG. 1, interpolation of image data is made in the vertical direction thereof to obtain the aspect ratio conformity. Alternatively, thinning of image data in the horizontal direction thereof may be made to obtain substantially the same effects by substantially the same operation as described above.

Further, while the above embodiment was structured to obtain the aspect ratio conformity between the CCD image pick-up component and the PC display, it is of course possible to construct a system to obtain the pixel number conformity. In this case, the number of transferred image data pixels is varied instead of the above interpolation process. More specifically, in the PC mode only 640×400 pixels of data, for instance, may be transferred from the frame memory 6 to the DCT/IDCT 7 in response to a command from the memory controller 5. Thus, the data itself is compressed in the pixel number of 640×400 conforming to the mode of display on the PC. The image data thus can be displayed or processed without need of any special process on the side of the PC. A certain portion of the normal screen of 768×480 pixels is not transferred in the PC mode mentioned above. Since this portion has nothing to be displayed, it is black in the electronic view finder 14 which is to be observed at the time of the photographing. In this case, it is suitable to display characters or the like, which are generated in the character generator 16, for instance, and indicative of PC data, in superimposition display on the display-free portion noted above, so that the operator can readily recognize the data to be PC data. Of course, it is possible to easily cope with any number of pixels, such as 512×512 and 640×480 as well as the above pixel number, substantially with the same construction. Furthermore, it is possible to cope not only with the number of pixels for the PC but also with those for the PAL and high vision TV system.

Meanwhile, in the above embodiment, to cope with the coexistence, in the same recording medium, of normal image data and some other image data such as those for the PC, these various data being of different image formats, a header is provided at the leading of each of these image data, thereby permitting the system controller 19 to recognize the format and designate the operation of the camera processing. Such header, however, is rather obstructive to process when processing or reproducing image data on the PC. Accordingly, a mode in which the header is provided and a mode without provision of any header may be provided for switching by the operator, when desired, in such a manner that the mode without provision of header is selected to maintain high data compatibility with the PC. Further, the data processing on the PC side is usually started from the leading portion of image data and ended in the final portion thereof. Accordingly, a mode may be suitably provided, in which the header is provided not at the leading portion but at the final portion of image data. In this construction, the header is not substantially obstructive on the PC, and nevertheless it is possible to permit the image data format decision on the camera side.

As shown above, according to the present invention it is possible to permit other image processing apparatuses having different recording statuses to process image data without need of any special data conversion process in these apparatuses.

Further, in the above embodiment several partner destination telephone number may be stored such that a first partner destination telephone number is dialed automatically if no special operation is made and that it can be changed to a different partner telephone number by suitable means operable when it is desired to dial such different partner telephone number. As the first partner telephone number may be selected one which is most frequently dialed. Doing so can improve operation control properties.

A different embodiment of the present invention will now be described, which can improve the operation control properties.

Figure 6:
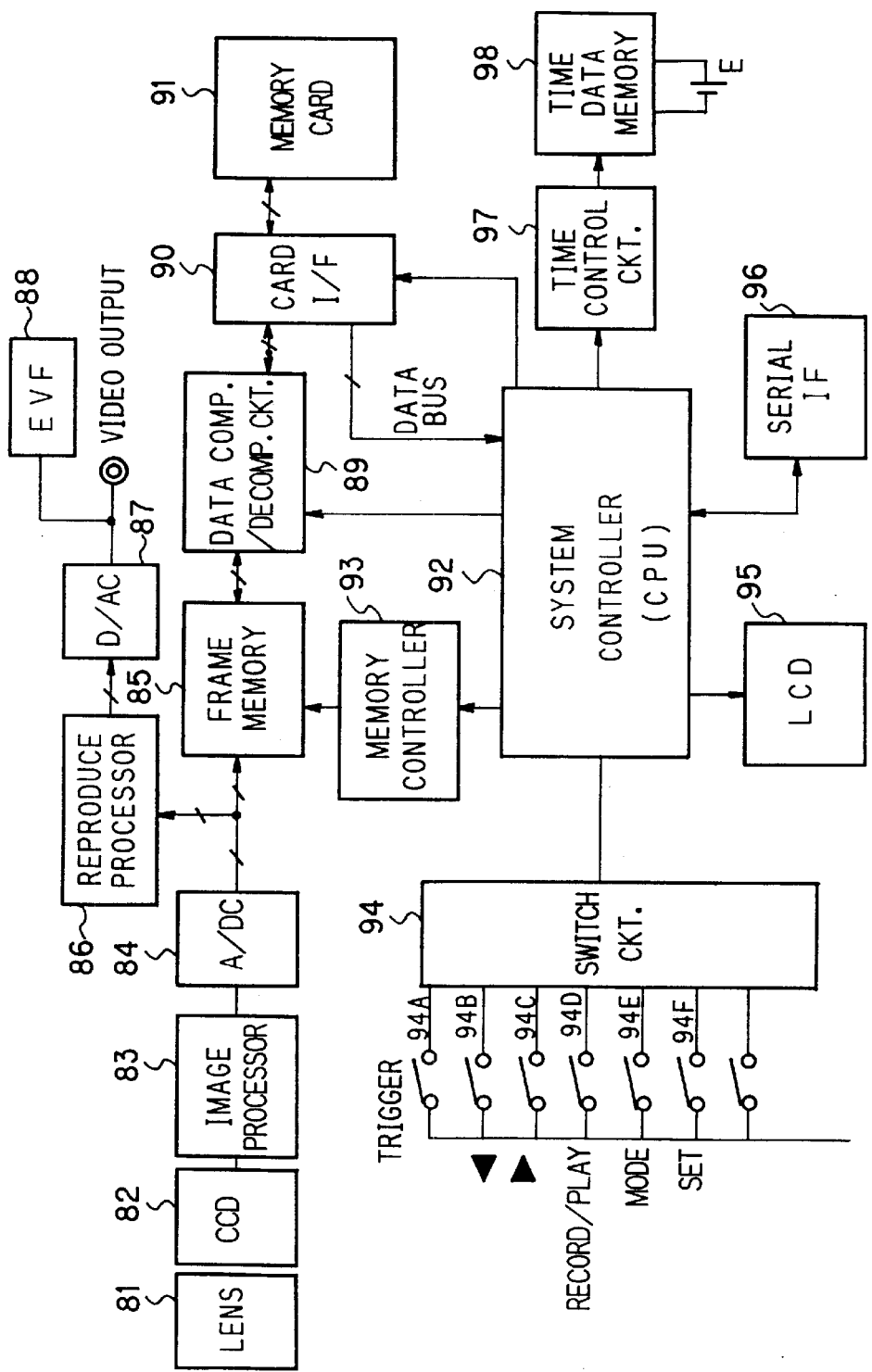
FIG. 6 shows another embodiment according to the present invention which can improve the operation control properties.

Referring to FIG. 6, an object image picked-up via a taking lens 81 on a CCD 82 is converted into an electronic signal, which is fed to an image signal processor 83 to be processed in a predetermined manner to obtain a video signal. The video signal is converted in an A/D converter 84 into a digital signal for recording in a frame memory 85. The output of the A/D converter 84 is also fed to a reproduce processor 86 for a reproduction process and then converted in a D/A converter 87 into an analog signal, which is fed to an electronic view finder 88 and also to a video output terminal. Video data which is read out from the frame memory 85 is compressed in a data compressing/decompressing circuit 89 and then fed via a card interface (I/F) 90 to a memory card 91 for recording.

In reproduction, video data which is read out from the memory card 91 via the card I/F 90 is decompressed in the data compressing/decompressing circuit 89 for recording in the frame memory 85. Video data read out from the frame memory 85, like the above case, is fed through the reproduce processor 86 and D/A converter 87 to the electronic view finder 88 and also to the video output terminal.

The frame memory 85 is controlled by a memory controller 93, which is operated under control of a control signal output from a system controller (CPU) 92. The system controller 92 controls the data compressing/decompressing circuit 89, card I/F 90, memory controller 93, etc. by receiving various operation signals from a switch circuit 94.

The switch circuit 94 receives the state signals of the following various switches instructing operations of the camera and feeds these signals to the system controller 92. Among the various switches are a trigger switch 94A for instructing exposure, focus lock, recording, etc., minus and plus feed switches 94B and 94C for selecting play-back image, a recording/play-back switch 94D for instructing a recording or play-back operation, a mode switch 94E for mode setting, a set switch 94F, etc. A LCD 95 displays the operating state of the camera and various pieces of information under control of the system controller 92. A serial interface (I/F) 96 transmits and receives data to and from a destination apparatus via a telephone line.

A time control circuit 97 controls time data under control of the system controller (CPU) 92. The time data has been stored in a time data memory 98 which is supplied with power from a back-up power source E. Where the time data memory 98 is an E²PROM, the back-up power source E is not required. In the time data memory 98 is also stored telephone number data which is supplied in manner to be described later.

Figure 7:
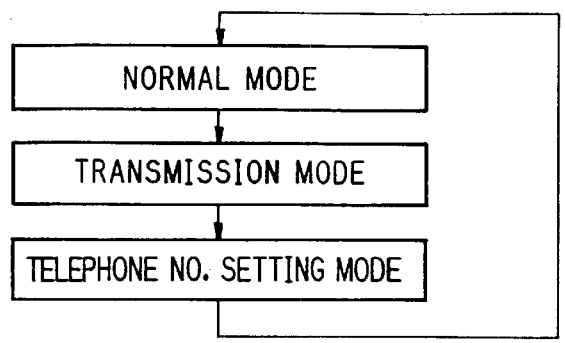
FIG. 7 shows individual modes which are switched one over to another each time the mode switch 94E of FIG. 6 is changed.

Among the operation modes of the electronic imaging apparatus having the above construction are a normal mode, in which an image is recorded and played-back, a transmission mode, in which image data is transmitted, and a telephone number setting mode, in which a destination telephone number for image transmission is set. The individual modes are switched one over to another as shown in FIG. 7 each time the mode switch 94E is operated.

FIG. 8A to FIG. 8E show an example of display on the EVF 88 and LCD 95 in the normal mode.

Figure 8A:
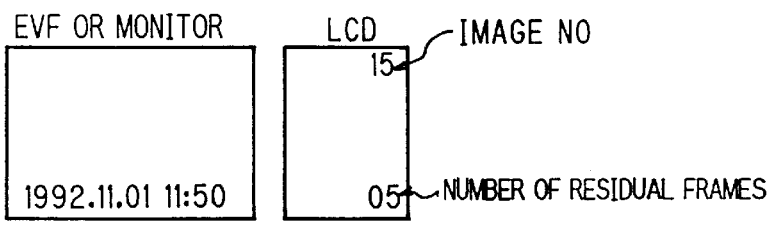
Figure 8A:
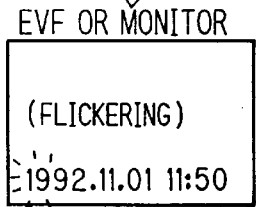
Figure 8A:
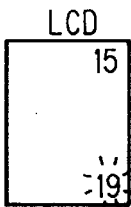
Figure 8C:
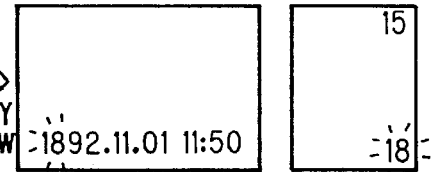
Figure 8C:
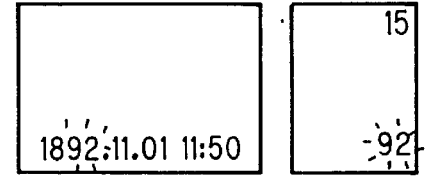
Figure 8C:
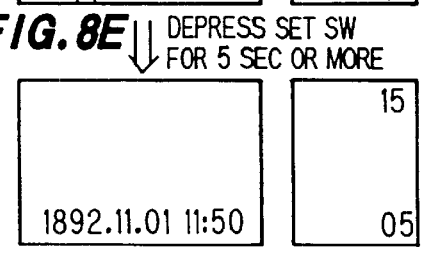

Shown in FIG. 8A is the example of display in the normal mode. Year, month, day and time are displayed on a bottom portion of an EVF or monitor screen. On the screen of the LCD 95, the number of recorded or reproduced image frames (in this example "15") is displayed on a right top portion, and the number of residual frames capable of recording (in this example "05") is displayed on a right bottom portion. When the set switch (SET SW) 94F is operated continuously for 5 seconds or more, for instance, the display is changed to one as shown in FIG. 8B. As shown, a two-digit numeral (in this example "19") is flicker displayed on a left bottom portion of the EVF screen. This numeral is also flicker displayed on a right bottom portion of the LCD 95. By operating the minus and plus feed switches 94B and 94C, the numeral in the flicker display is changed (to "18" in this example) as shown in FIG. 8C. Then, by depressing the set switch 94F the display "18" in FIG. 8C is confirmed, and the digits in the flicker display are shifted to the right by two digits, thus flicker displaying numeral "92" as shown in FIG. 8D. Then, by operating the set switch 94F continuously for 5 seconds or more, the setting operation is ended, and the confirmed setting date is displayed as in FIG. 8E.

Figure 9A:
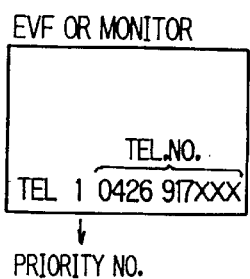
FIG. 9A and FIG. 9B show an example of display on the EVF 88 and LCD 95 in the transmission mode.
Figure 9A:
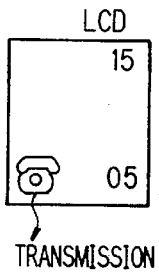
Figure 9B:
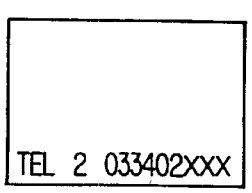
Figure 9B:
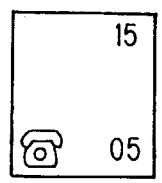

FIG. 9A and FIG. 9B show an example of display on the EVF 88 and LCD 95 in the transmission mode. In the transmission mode, as shown in FIG. 9A, a destination telephone number (for instance "TEL1 0426 917xxx" in this example) is displayed on a bottom portion of an EVF 88 (or monitor). The numeral "1" succeeding "TEL" represents the priority number. In the LCD 95, a mark (i.e., telephone mark) indicative of the transmission mode is displayed on a left bottom portion. Also, the number of frames of recording or play-back and the number of residual frames available for recording like those in FIG. 8A are displayed on right top and bottom portions. By operating the set switch 94F in this state, the telephone number of the next priority order (i.e., the second priority order) is displayed on the EVF 88 as shown in FIG. 9B. In this way, destination telephone numbers are successively displayed in response to the operation of the set switch 94F.

FIG. 10A to FIG. 10E show an example of display in the telephone number setting mode.

Figure 10A:
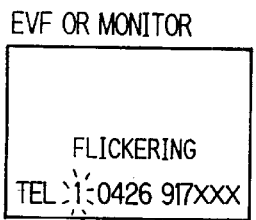
Figure 10A:
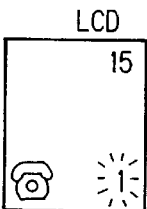
Figure 10A:
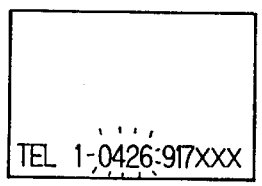
Figure 10A:
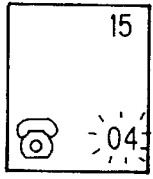
Figure 10C:
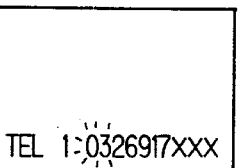
Figure 10C:
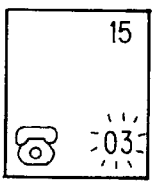

When the telephone number setting mode is set up, the numeral ("1" in this example) representing the priority order, displayed on a telephone number display section in the EVF 88, is flicker displayed as shown in FIG. 10A. At the same time, a similar flicker display is made on a right bottom portion of the LCD 95. This flicker display represents the numeral to be set as updating numeral. The updating of the numeral is caused by operating the minus and plus feed switches 94B and 94C. The numeral after the updating is confirmed by operating the set switch 94F, and the flicker display is changed to the numeral part to be updated next ("04" in this example) as shown in FIG. 10B. Shown in FIG. 10C is the display of an updated numeral "03" obtained by operating the minus and plus feed switches 94B and 94C. In this state, the numeral may be confirmed by operating the set switch 94F.

Figure 10D:
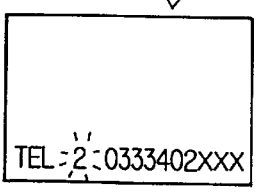
Figure 10D:
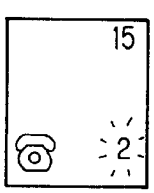
Figure 10D:
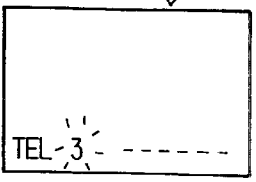
Figure 10D:
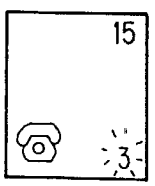

With such operation of the set switch 94F, the telephone number of the second priority order is displayed as shown in FIG. 10D after the setting of the first priority order telephone number Shown in FIG. 10E is the display of the third priority number telephone number that is set. In this stage, the telephone number is not recorded yet, nor it is displayed on the screen.

Figure 11:
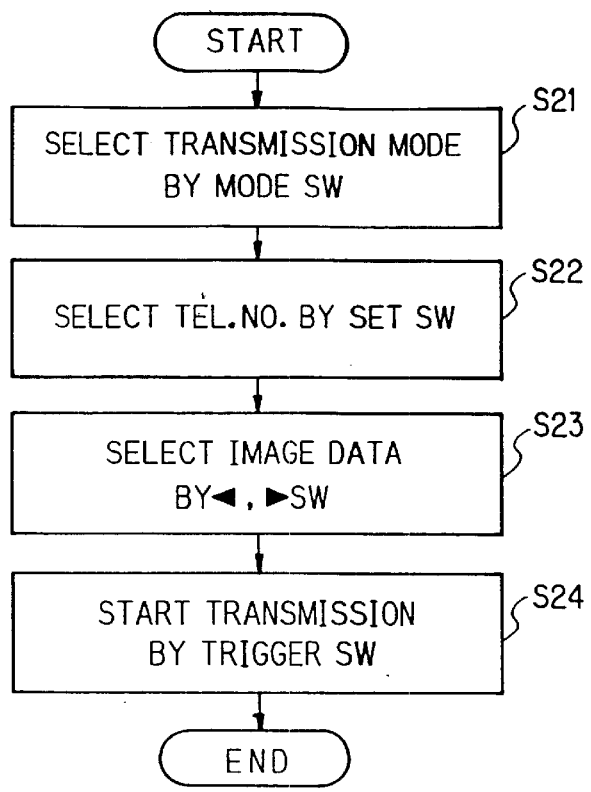
FIG. 11 shows a flow chart of the image transmission routine in the embodiment.

FIG. 11 shows a flow chart of the image transmission routine in this embodiment. After the start of the routine, the transmission mode is selected with the operation of the mode switch 94E (step S21). The telephone number selection is then made by the set switch 94F (step S22). Then, image data to be transmitted is selected by the minus and plus feed switches 94B and 94C (step S23). Then, a transmission process is started by the trigger switch 94A (step S24).

Figure 12:
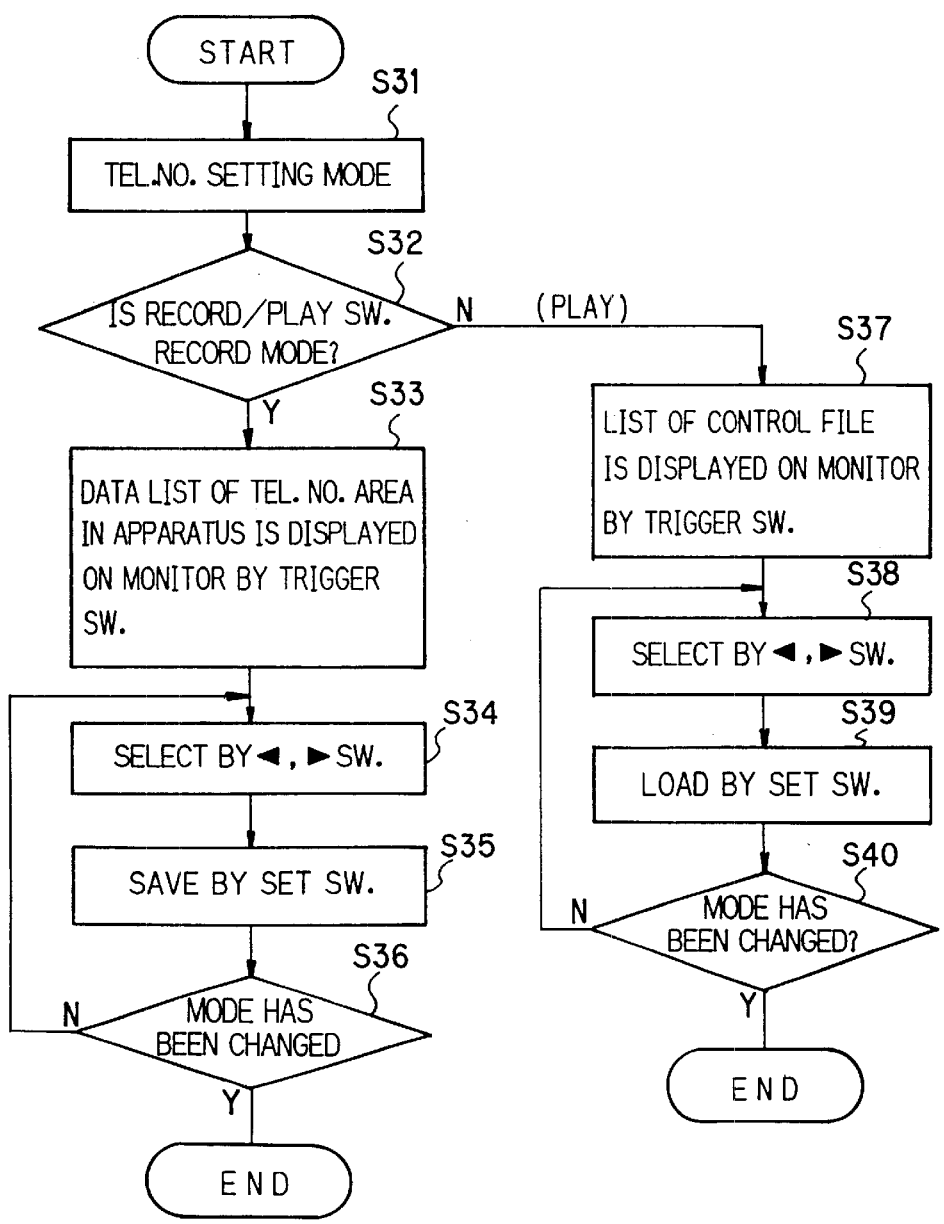
FIG. 12 shows a flow chart representing a telephone number save and load routine.

FIG. 12 is a flow chart showing a telephone number save and load routine.

After the start of the routine, the telephone number setting mode is set by the mode switch 94E (step S21). Then, a discrimination is made as to whether the record/play-back switch 94D is providing the recording mode (step S32). If it is discriminated that the recording mode prevails, a data list of a telephone number area in the apparatus is displayed on a monitor by depressing the trigger switch 94A (step S33). Necessary data is then selected with the minus and plus feed switches 94B and 94C (step S34). Then, the data is saved from the apparatus into the memory card by the set switch 94F (step S35). Then, a discrimination is done as to whether the mode has been changed (step S36). If the mode has been changed, the routine goes back to the step S34. If the mode has not been changed, an end is brought to the routine.

Figure 13:
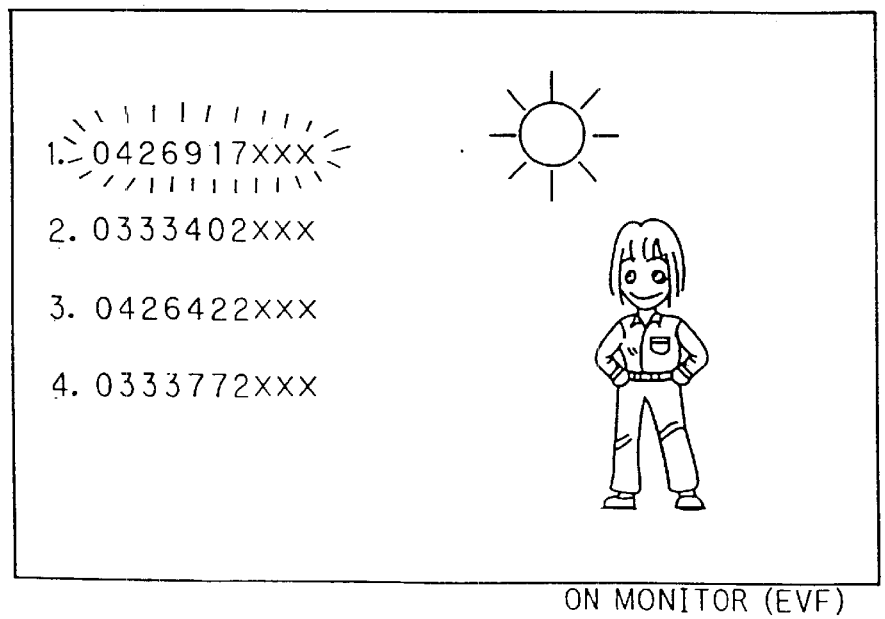
FIG. 13 shows an example of a monitor display of a list in a control file in the embodiment in the play-back mode thereof.

If it is found in the step S32 that the play-back mode prevails, the control file list is displayed on the monitor by depressing the trigger switch 94A (step S37). FIG. 13 shows an example of display at this time. Then, the necessary telephone number is selected with the minus and plus feed switches 94B and 94C (step S38), and then loading of data from the memory card to the data memory area in the apparatus is made by the set switch 94F (step S39). At this time, the loaded data may be deleted from the monitor display. Also, if the same telephone number is selected once again, some alarm may be displayed to prevent double selection. The steps S38 and S39 are executed repeatedly until it is discriminated in the step S40 that the mode has been changed.

In the above embodiment, the transmitted information of the electronic imaging apparatus may be static image data, sound data or any other data. Further, it may be what is obtained by processing an image signal externally input via the input means in an image signal processor and recording the processed image signal. Still further, it may be what is obtained by recording image data with a different electronic imaging apparatus and storing the data in a medium conforming to the present electronic imaging apparatus.

FIG. 13 shows an example of monitor display of a list in a control file in this embodiment in the play-back mode thereof.

In the above embodiment, more telephone numbers may be stored by increasing the back-up memory area. In addition, a desired telephone number can be easily selected from among a plurality of telephone numbers Further, the telephone number setting may be made by operating fewer keys. The procedure of setting is substantially equal to the time setting and is easy for the user. Particularly, when the present invention is applied to a portable electronic imaging apparatus as in the above embodiment, satisfactory portability and operation control properties are obtainable to contribute to the camera body size reduction.

Moreover, in the telephone number setting mode, it is possible to execute the following function. That is, in response to the depression of the trigger switch where the recording/play-back switch has been switched to the recording side, the contents of the telephone number memory area is stored to the record medium (for instance, memory card) at a time as a control file, and on the other hand, where the recording/play-back switch has been switched to the play-back side, the contents of the control file is loaded to the telephone number memory area at a time.

I claim:

1. An electronic still camera being operable in a plurality of operation modes including a data transmitting mode and a data receiving mode, those modes being selectively switchable by a user, where in said data transmitting mode and said data receiving mode, image data to be sent or received is conveyed via an external transmitting channel, and said electronic still camera being integral with a camera body, the camera comprising:
    a switching member disposed on said camera body for selectively switching said operation modes from said data transmitting mode to said data receiving mode and vice-versa responsive to displacement of said switching member;
    a display element, disposed on said camera body, for displaying whether a present operation mode is said data transmitting mode or said data receiving mode by a symbolic pointing display, a pointing direction of which corresponds to a direction of said displacement of said switching member; and
    data processing means for, when said camera is in said data transmitting mode, transmitting data to said external channel and for, when said camera is in said data receiving mode, receiving data from said external channel.

2. The camera of claim 1, wherein said data processing means is for transmitting and receiving data over a telephone network.

3. The camera of claim 2, wherein said display element includes an LCD display device.

4. The camera of claim 1, wherein said symbolic pointing display of said display element includes an arrow mark display.

5. The camera of claim 1, wherein the electronic still camera includes an optical sensor for generating image data representative of an image incident thereon, the optical sensor being disposed in said camera body.

6. The camera of claim 1, wherein said switching member and said display element are separate from one another.

7. An electronic still camera being operable in a plurality of operation modes including a camera mode for taking a picture and a communication mode for transmitting and receiving image data, those modes being selectively switchable by a user, where in said communication mode, image data to be sent or received is conveyed via an external transmitting channel, said electronic still camera being integral with a camera body, said camera comprising:
    a display element disposed on said camera body for displaying whether a present operation mode is said camera mode or said communication mode; and
    a switching member disposed on said camera body for selectively switching operating modes between a recording mode and a play-back mode, if said camera mode is set, and for selectively switching operating modes between a transmitting mode and a receiving mode, if said communication mode is set; and
    data processing means for, when said camera is in said transmitting mode, transmitting data to said external channel and for, when said camera is in said receiving mode, receiving data from said external channel.

8. The camera of claim 2, wherein said data processing means is for transmitting and receiving data over a telephone network.

9. The camera of claim 7, wherein the electronic still camera includes an optical sensor for generating image data representative of an image incident thereon, the optical sensor being disposed in said camera body.

10. The camera of claim 7, wherein said switching member and said display element are separate from one another.

* * * * *